United States Patent [19]

Wristers

[11] 4,077,903

[45] Mar. 7, 1978

[54] PREPARATION OF AN ACTIVE OLEFIN POLYMERIZATION CATALYST

[75] Inventor: Harry J. Wristers, Baytown, Tex.

[73] Assignee: Exxon Research & Engineering Co., Linden, N.J.

[21] Appl. No.: 635,316

[22] Filed: Nov. 26, 1975

[51] Int. Cl.$^2$ .................... B01J 31/02; B01J 27/06
[52] U.S. Cl. .................... 252/429 C; 252/429 A; 252/442
[58] Field of Search ............... 252/429 A, 429 C, 442

[56] References Cited

U.S. PATENT DOCUMENTS

| | | | |
|---|---|---|---|
| 2,943,068 | 1/1960 | Eby et al. | 252/429 C |
| 2,971,925 | 2/1961 | Winkler et al. | 252/429 C |
| 2,976,271 | 3/1961 | Lippincott et al. | 252/429 C |
| 3,226,336 | 12/1965 | Schrage et al. | 252/429 C |
| 3,825,524 | 7/1974 | Wada et al. | 252/429 C |
| 3,905,915 | 9/1975 | Wristers | 252/429 A |

FOREIGN PATENT DOCUMENTS 49-83696    0000    Japan.

*Primary Examiner*—Patrick P. Garvin
*Assistant Examiner*—John F. Niebling
*Attorney, Agent, or Firm*—David A. Roth; M. B. Kurtzman

[57] ABSTRACT

A titanium catalyst for polymerization of olefins is prepared by reduction of $TiCl_4$ with a mixture of $AlEt_2Cl$ and $AlEt_3$, where at high $AlEt_3$ to $AlEt_2Cl$ ratios the aluminum reducing agents are added to the $TiCl_4$ solution. The reduction is performed from $-50°$ to $0°$ C in a hydrocarbon and the reduced titanium compound is activated by heating to a higher temperature and subsequently is used with a cocatalyst for polymerization of olefins.

10 Claims, No Drawings

PREPARATION OF AN ACTIVE OLEFIN POLYMERIZATION CATALYST

CROSS REFERENCE TO RELATED APPLICATIONS

This application is not formally related to any pending patent application or issued patent of this inventor.

BACKGROUND OF THE INVENTION

1. Field of Invention

This invention relates to an improvement in the preparation of a Ziegler catalyst for the polymerization of olefins wherein the improvement involves a more ready control over the reduction of the catalyst component and consequently a better control over the particle size and composition of the catalyst.

2. Problem to Which Invention is Directed $TiCl_3$ cocrystallized with $AlCl_3$ can be prepared by reduction of $TiCl_4$ with aluminum alkyl halides. It is desired in the industry to prepare catalyst samples where the individual catalyst particles have diameters greater than 12 microns and where the catalyst samples have a narrow particle size distribution. These goals can be achieved by using as a reducing agent $AlEt_2Cl$ or $AlEtCl_2$. Any attempts to use $AlEt_3$ lead to catalyst particles whose diameters are normally less than 3 microns. With $AlEt_2Cl$ or $AlEtCl_2$ as reducing agents, the aluminum chloride content in the catalyst product, $TiCl_3 \cdot nAlCl_3$, is higher than desired and may lead to catalysts of low activity. Catalysts with optimum aluminum chloride content, where $n = 0.25$–$0.35$, can be prepared using compounds such as $AlEt_3$ or trialkyl aluminum as reducing agents. As pointed out before, trialkyl aluminum reducing agents lead to fine catalyst particles.

3. Description of Prior Art

It is well known in the prior art that olefins such as ethylene, propylene or higher olefins (as well as diolefins) can be polymerized to polymers of medium and high molecular weight by contacting them with Ziegler catalysts. Of these many Ziegler catalysts, the composition of $TiCl_3 \cdot nAlCl_3$, where n is usually about 0.33, in conjunction with a cocatalyst, such as $AlEt_2Cl$ or $AlEt_3$, is most commonly used. The $TiCl_3 \cdot nAlCl_3$ can be prepared by various techniques of which the following two are the ones most commonly employed:

(a) reduction of $TiCl_4$ with aluminum
(b) reduction of $TiCl_4$ with aluminum alkyl halides By proper manipulation of conditions in the latter reduction procedure, one can obtain catalyst samples whose particle size distribution is narrow and whose particle size (diameters) can be varied. Most commonly the reducing agent used for the reduction of $TiCl_4$ is $AlEt_2Cl$ as disclosed in British Pat. No. 1,139,450 assigned to Shell International Research, and South African Applications Nos. 67-7828 and 67-7829, assigned to Hercules Inc.

It is also well known in the prior art that $TiCl_3$ catalysts such as these, when heated to temperatures above 150° C, are converted from their $\beta$ form to the more active $\alpha$ or violet form. As for example in U.S. Pat. No. 2,971,925 to Winkler et al and U.S. Pat. No. 3,261,821 to Vandenberg.

By the use of different reducing agents, catalysts of different compositions are obtained. Furthermore, the use of different reducing agents in the reduction of $TiCl_4$ under proper conditions may lead to catalyst samples with different physical properties. It is highly desirable to obtain catalyst samples with optimum catalyst compositions along with proper physical properties. It is toward this goal that this invention is directed.

The prior art on mixed alkyl reduction also includes the following:

U.S. Pat. No. 2,943,068 (Jan. 28, 1960), L. T. Eby et al, claims brown reduction product of $TiCl_4$ and $AlEt_2Cl/AlEt_3$ for polymerization of ethylene. The product which becomes inactive on standing may be reactivated with $AlEtCl_2$. I claim very specific conditions to prepare a spherical reduction product which is purple for the polymerization of propylene.

U.S. Pat. No. 2,962,491 (Nov. 28, 1960), Mertzweiler, claims partial reduction of $TiCl_4$ with $AlEt_2Cl$ and $AlEtCl_2$. The mixture $AlEt_2Cl/AlEtCl_2$ is entirely different and will give different results than $AlEt_2Cl/AlEt_3$.

U.S. Pat. No. 3,108,973 (Oct. 29, 1963), Vandenberg, claims $TiCl_4$ reduced by $AlEt_2Cl$ or mixture of $AlEt_2Cl/AlEtCl_2$ and activated in polymerization with mixture of $AlEt_2Cl/AlEt_3$. Same argument as above applies. The mixture of $AlEt_2Cl/AlEt_3$ used in polymerization would be expected to give different results than when used in reduction.

SUMMARY OF THE INVENTION

An improved polyolefin catalyst is prepared by reducing $TiCl_4$ with a mixture of $AlEt_2Cl$ and $AlEt_3$ instead of $AlEt_2Cl$.

DESCRIPTION OF THE PREFERRED EMBODIMENTS

It is an advantage of this invention that a catalyst for polymerization of olefins can be prepared which is highly active, highly stereospecific, and which has favorable physical properties, i.e. catalyst samples whose individual particles have a narrow particle size distribution and whose individual particles have diameters greater than 12 microns. This can be achieved by reducing $TiCl_4$ with a mixture of $AlEt_2Cl$ and $AlEt_3$. The $AlEt_2Cl$ tempers the high activity of the $AlEt_3$ reducing agent. The mode of mixing of the reagents is important to obtaining an acceptable final product.

In the reduction of $TiCl_4$ with aluminum alkyl halide, the nature of the aluminum alkyl halide determines to a great extent the composition of the solid catalyst. For example, according to equation 1, below, $$TiCl_4 + AlEtCl_2 \rightarrow TiCl_3 \cdot AlCl_3 + Et. \tag{1}$$

$AlEtCl_2$ used as a reducing agent leads to a catalyst high in aluminum chloride content. The use of $AlEt_2Cl$ (equation 2) or $AlEt_3$ (equation 3)

$$TiCl_4 + 0.5\ AlEt_2Cl \rightarrow TiCl_3 \cdot \tfrac{1}{2}AlCl_3 + Et. \tag{2}$$

$$TiCl_4 + 0.33\ AlEt_3 \rightarrow TiCl_3\ 0.33\ AlCl_3 + Et. \tag{3}$$

leads to catalysts lower in aluminum chloride content.

It is possible to change the composition of the solid catalyst by using an excess of reducing agent. A problem that is associated with this technique is that the catalyst particles decrease in size as the ratio of reducing agent to $TiCl_4$ is increased. There are several problems associated with using $AlEt_3$ as a reducing agent as opposed to $AlEt_2Cl$ or $AlEtCl_2$. First of all, it is a much more active reducing agent so that an excess of $AlEt_3$ will lead to overreduction of $TiCl_3$ to $TiCl_2$ which is a less stereospecific and less active catalyst. Secondly, the use of $AlEt_3$ as reducing agent leads to catalyst samples whose particles are very fine in size and consequently are undesired in many parts of the industry. While mixing $TiCl_4$ with $AlEt_3$ at very low temperatures, such as $-75°$ C, and changing the mode of mixing from adding $TiCl_4$ to $AlEt_3$ or vice versa, one still obtains catalyst samples that are undesirable.

It has been found that when $AlEt_2Cl$ is mixed with $AlEt_3$ and this mixture of reducing agents is added to $TiCl_4$ at $-30°$ C, acceptable catalyst particles are formed. The mode of mixing of components is important in situations where the $AlEt_3$ to $TiCl_4$ ratio is above 0.15. Thus as the examples will show, addition of $TiCl_4$ to mixtures of $AlEt_3$ and $AlEt_2Cl$ in these cases where the ratio is in excess of 0.15 will lead to catalyst samples wide in particle size distribution and heterogeneous in physical properties.

It is believed, although this invention should not be limited to this, that the addition of $AlEt_2Cl$ and $AlEt_3$ mixture to $TiCl_4$ at low temperature results in a rapid reduction of $TiCl_4$ by the minor amount of $AlEt_3$. Subsequently, $AlEt_2Cl$ coats the catalyst particles and proceeds to further reduce the adsorbed $TiCl_4$ at a slower rate. The adsorbed or complexed $AlEt_2Cl$ protects the reduced $TiCl_4$, $TiCl_3$ from further attack by freshly added $AlEt_3$. The $AlEt_2Cl$ mixed with $AlEt_3$ further tempers the reducing ability of the $AlEt_3$ through formation of an associated complex.

The invention is further illustrated in the following examples. Table I summarizes the reaction conditions and resulting compositions. The composition of the reducing mixture can be varied but beyond a certain concentration of $AlEt_3$ in the reducing mixture the mode of mixing of reagents becomes important.

The data in Table II illustrate that as the alkyl group content in the reducing agent, $AlR_nX_{3-n}$, is increased from 1 to 3, the $AlCl_3$ content in the catalyst product is reduced. Furthermore, the activity data of the catalyst with different $AlCl_3$ contents, as seen in Table I, shows that near optimum catalyst activity is obtained where the aluminum content is near 0.25 to 0.35. This kind of catalyst composition in catalyst samples with the most favorable physical properties stated earlier, can only be obtained by using as a reducing agent, mixtures of $AlEt_2Cl$ and $AlEt_3$ according to this invention.

Table I

Reduction of $TiCl_4$ with Mixtures of $AlEt_2Cl$ and $AlEt_3$

| Run No. | $TiCl_4$ Vol., cc | $TiCl_4$ Moles $\times 10^3$ | $AlEt_2Cl$ Vol., cc | $AlEt_2Cl$ Moles $\times 10^3$ | $AlEt_3$ Vol., cc | $AlEt_3$ Moles $\times 10^3$ | Catalyst Addition Ti to Al | Catalyst Addition Al to Ti | Mixing Temp., °C | Stirring Speed, rpm | Catalyst Size, microns | Catalyst Particle Size Distribution | Heptane, Vol., cc | Mole Ratio $TiCl_4:AlEt_2Cl:AlEt_3$ |
|---|---|---|---|---|---|---|---|---|---|---|---|---|---|---|
| 4271-13 | 75[a] | 170.6 | 63.6[b] | 102.4 | 23.7[c] | 25.6 | | x | −30 | 250 | 15.5 | Average | 73 | 1:0.6:0.15 |
| 4271-12 | 75[a] | 170.6 | 63.6[b] | 102.4 | 23.7[c] | 25.6 | x | | −30 | 250 | 11-15 | Wide | 73 | 1:0.6:0.15 |
| 4271-11 | 75[a] | 170.6 | 68.8[b] | 110.9 | 15.8[c] | 17.06 | x | | −30 | 250 | 10-21 | Average | 75 | 1:0.65:0.10 |
| 4271-10 | 75[a] | 170.6 | 74.1[b] | 119.4 | 7.9[c] | 8.5 | x | | −30 | 250 | 20 | Narrow | 78 | 1:0.70:0.05 |
| 4060-42 | 75[e] | 149 | — | — | 60[f] | 60 | x | | −70 | 210 | 1.5-2.5 | Narrow | — | 1:0:0.4 |
| 4060-46 | 50[a] | 114 | — | — | 45.7[f] | 45 | | x | −70 | 240 | 1.8-7.0 | Wide | — | 1:0:0.4 |

[a]2.274 molar concentration in heptane.
[b]1.6106 molar concentration in heptane.
[c]1.079 molar concentraton in heptane.
[e]2.0 molar concentration in heptane.
[f]1.0 molar concentraton in heptane.

TABLE II

| Run No. | Reducing Agent $AlR_nCl_{3-n}$ | Mole Ratio, $TiCl_4:AlR_nCl_{3-n}$ | Catalyst Particle Size, microns | Catalyst Composition $TiCl_3 \cdot nAlCl_3$, n | Activity, gms $PC_3=$ gm $TiCl_3$ . 2 hrs |
|---|---|---|---|---|---|
| 4060-46-2 | $AlEt_3$ | 2.5 | 1 | 0.35 | 31.7 |
| 4121-58-2 | $AlEt_2Cl$ | 2 | 27 | 0.50 | 19.2 |
| 4121-79-2 | $AlEt_{1.5}Cl_{1.5}$ | 1.25 | 30 | 0.62 | 16.5 |
| 4122-10-2 | $AlEtCl_2$ | 0.67 | 50 | 1.0 | 18.7 |

It should also be noted that Japanese Pat. No. 9083-696 published on Dec. 18, 1972 also shows the reduction of $TiCl_4$ with mixtures of aluminum trialkyl and aluminum dialkyl chloride. However, this reference does not teach the use of very small quantities of aluminum trialkyl in the presence of the aluminum dialkyl monochloride. Furthermore this reference has no teaching with respect to the improved catalyst particle size and distribution that can be obtained in utilizing the very low quantities of the aluminum trialkyl which is taught by applicant.

The other patent of some significance is German DT No. 2342-416, published on Oct. 6, 1962. That patent teaches an initial reduction of $TiCl_4$ with 0.36 mols of aluminum triethyl over a long period of time followed by subsequent treatment with 0.73 mols of aluminum diethyl chloride over a long period of time followed by a final $TiCl_4$ treat. The net effect of the process is considerably different from that of applicant's since the quanity of aluminum triethyl used is much higher than that specified by applicant. It is clear from applicant's data that very small particle size $TiCl_3$ is formed from the initial reaction of $TiCl_4$ with the aluminum triethyl. It is only after the subsequent $TiCl_4$ is added as the next to last step of the reaction that a reasonably large particle size is obtained. In contrast to the DT No. 2342-416 patent, applicant obtains excellent particle size and distribution without having to utilize a final $TiCl_4$ reduction step.

In any event, applicant's experiments and reductions to practice were carried out at dates much earlier than these patents' effective filing and publication dates.

Generally speaking, the mean particle diameter will be about as low as 10, and up to 200 microns, preferably 12 to 50 microns, and most preferably about 20 to 25 microns.

The general reaction conditions and equipment utilized in the technique of the invention, especially that of the examples, is disclosed in U.S. Pat. No. 3,905,915, which is hereby incorporated by reference in its entirety.

For the purposes of this invention, the term "alkyl" as used herein means a $C_1$ to $C_{12}$ aliphatic hydrocarbon group. The ethyl species is particularly preferred.

In general, it is recognized by the art that if the aluminum chloride content of a cocrystallized $TiCl_3$ aluminum chloride catalyst can be considerably reduced from its normal quantity to the 0.25 to 0.35 range results in considerably better catalyst.

If desired, the catalyst produced by the process of this invention can be additionally improved by treatment with a Lewis base, especially diisoamyl ether or n-butyl ether to extract residual titanium trichloride from the catalyst, followed by washing and activation by the use of $TiCl_4$.

The resulting catalyst can be used as is with a standard cocatalyst, or can be additionally made more active by utilizing a third component, such as another Lewis base in the polymerization reaction.

This approach is described in German patent DT No. 2457-278 which is incorporated herein in its entirety by reference.

Generally speaking, the mole ratio of aluminum trialkyl to titanium tetrachloride is from about 0.01 to 0.15, preferably about 0.05 to 0.15.

It should be further noted that the reducing agent, e.g. aluminum trialkyl and aluminum dialkyl chloride combinations, can be additionally complexed with various Lewis bases to further improve the titanium chloride catalyst produced. Thus, Lewis bases are complexed with the reducing agent. The preferred Lewis bases are ethers or thioethers which can be described by the formula ROR', RSR', where R and R' are hydrocarbon radicals containing from 1 to 15 carbon atoms, preferably R and R' are branched hydrocarbon radicals containing from 2 to 8, preferably from 4 to 6, carbon atoms.

The complexing agent is mixed with the reducing agent in the ratio of from 0.01 to 5:1, or preferably from 1.0 to 5:1, most preferably in the ratio from 1-2:1.

The details on utilizing a complexing agent complexed with the reducing agent to achieve improved reduction of $TiCl_4$ to $TiCl_3$ is described in detail in applicant's United States patent application entitled "Reduction of $TiCl_4$ with Reducing Agents Modified with Lewis Bases", Ser. No. 622,956 filed Oct. 16, 1975, which application is hereby incorporated by reference in its entirety in this instant application.

What is claimed is:

1. A process of preparing $TiCl_3.nAlCl_3$ catalysts where $n = 0.25$ to 0.35 having a mean particle diameter size of from 10 to 200 microns and narrow particle size distribution which consists of reducing $TiCl_4$ with a mixture of $AlEt_3$ + $AlEt_2Cl$ wherein the mole ratio of $AlEt_3$ to $TiCl_4$ is from 0.01 to 0.15:1 at a reduced temperature of from about $-50°$ to about $0°$ C, gradually raising to an elevated temperature sufficient to convert the $TiCl_3.nAlCl_3$ catalyst to the violet form.

2. The process of claim 1 wherein said ratio is about 0.05:1.

3. The process of claim 1 wherein said ratio is about 0.15:1.

4. The process of claim 1 wherein said mixture of aluminum compounds is gradually added to said $TiCl_4$ over the space of about 0.2 to 10 hours at a temperature of from $-50°$ to $+50°$ C.

5. The process of claim 1 wherein said titanium compound is added to said mixture of aluminum compounds over a space of from 0.2 to 10 hours at a temperature of from $-50°$ to $+50°$ C.

6. The process of claim 4 which is carried out under constant stirring.

7. The process of claim 5 which is carried out under constant stirring.

8. The process of claim 1 wherein said mixture also is complexed with a Lewis base.

9. The process of claim 8 wherein said Lewis base is R—O—R', wherein R and R' are alkyl groups having from 2 to 6 carbon atoms.

10. The process of claim 9 wherein said ether is is diisoamyl ether.

* * * * *